Dec. 28, 1948.  C. W. MARTIN  2,457,253
REFLECTING OPTICAL OBJECTIVE SYSTEM
Filed Dec. 22, 1947
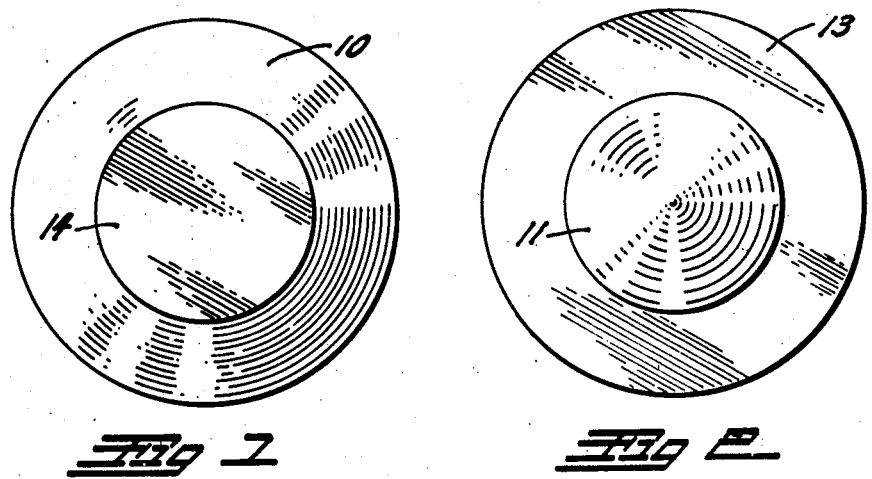
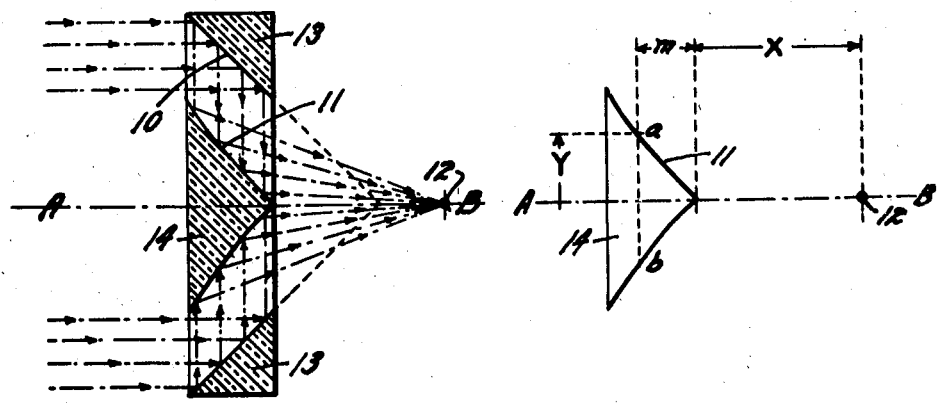
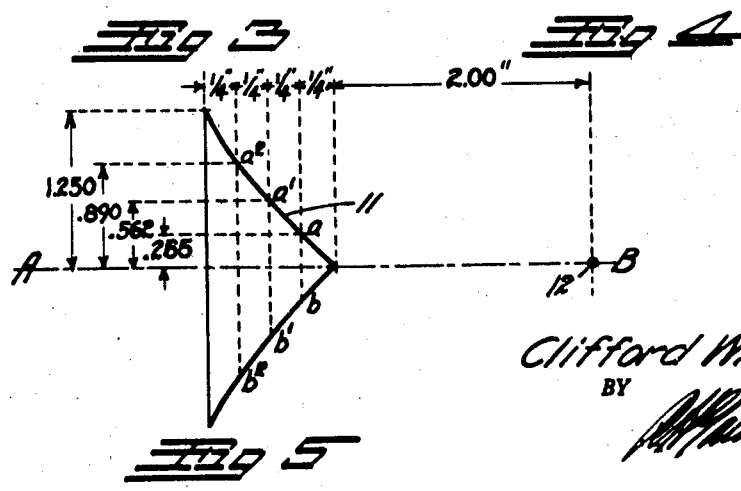
INVENTOR.
Clifford W. Martin
BY
ATTORNEY Patented Dec. 28, 1948

2,457,253

UNITED STATES PATENT OFFICE 2,457,253

REFLECTING OPTICAL OBJECTIVE SYSTEM

Clifford W. Martin, Denver, Colo.

Application December 22, 1947, Serial No. 793,146

2 Claims. (Cl. 88—57)

This invention relates to a reflecting optical system for use as an optical objective for various purposes, including photographic equipment, light projection devices, microscopes, and telescopes. Such objectives have hitherto usually consisted of a system of refracting lenses, and serious difficulties have consequently arisen in achieving any refined correction of chromatic aberration.

The use of reflecting surfaces avoids such difficulties, and the present invention has for its object to provide a highly efficient objective in which the optical power is supplied exclusively by reflecting surfaces.

Another object of the invention is to provide an optical system of the reflecting type which will give greater light-transmitting efficiency than a lens of the same diameter, and which will focus the rays without chromatic aberration and with a minimum of spherical aberration.

A further object is to provide a reflecting optical system in which the rays will be maintained about a common optical axis so as to eliminate any angular or side reflection such as is usually employed in reflecting telescopes and the like, and to obtain a greater depth of focus for a given aperture than has heretofore been possible.

Other objects and advantages reside in the detail construction of the invention, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Fig. 1 is a front view of an embodiment of the improved reflecting optical system;

Fig. 2 is a rear view thereof;

Fig. 3 is a cross-section, taken on the line 3—3, Fig. 1, illustrating the paths of typical light rays through the system;

Fig. 4 is a diagrammatic illustration of the formula employed for obtaining the curvature of one of the reflecting surfaces employed in the improved system; and Fig. 5 is a diagrammatic illustration of the formula of Fig. 4, worked out for a focal length of 2.

In the drawing, only the essential optical elements are illustrated. All supporting structures and enclosures have been eliminated for the sake of clarity.

The improved optical system employs an outer, annular, inclined, reflecting surface 10 and an inner reflecting surface 11 positioned concentrically within the annulus of the outer surface 11. The two surfaces 10 and 11, or either of them, may be formed on solid glass blocks, such as indicated at 13 and 14, respectively, in Fig. 3, although the solid blocks are not necessary, since only the surfaces thereof are employed in the improved system.

The surface 10 is inclined on a conical angle, preferably of 45°. Any radial cut section through the reflecting surface 10 will present a straight line. The surface 11 is generally conical, and might best be described as concave-conical. Any radial cut through the surface 11 will present a curved line determined by a mathematical formula based upon the focal length desired.

The formula for the concave curvature of the surface 11 is illustrated diagrammatically in Fig. 4, the focal point being indicated at 12 and the optical axis at A—B. Let us assume that it is desired to ascertain the radius (Y) of any circular frustrum such as $a$—$b$. The following formula is used:

$$Y = \frac{(X+m)^2}{2X} - \frac{X}{2}$$

in which X is the focal length desired and $m$ is the distance from the apex of the surface 11 along the optical axis to the given circular plane $a$—$b$.

As an example, let us assume that the curvature of the surface 11 is desired for a focal length of 2″ and a depth or thickness of 1″. Three planes are selected, $a$—$b$, $a^1$—$b^1$, and $a^2$—$b^2$, spaced ¼″ from each other and ¼″ from the apex and the base of the surface 11.

Solving for the plane $a$—$b$, thus, $$.265'' = \frac{(2+.25)^2}{4} - 1,$$

we obtain the radius .265″.

Solving similarly for the planes $a^1$—$b^1$ and $a^2$—$b^2$, we obtain the radii .562″ and .890″, respectively. Solving for the base radius, we obtain 1.25″ or a diameter of 2.50″.

For the most efficient light gathering, the diameter of the smaller opening in the block 13, or in other words, the smaller diameter of the surface 10 should equal the diameter of the base of the block 14, that is, the diameter of the surface 11. The two blocks should be equal in thickness, since any excess thickness of one over the other would be of no value, and any decrease in thickness would result in light loss.

Therefore, in the above example we obtain an inner diameter of 2.50" for the surface 10 and, since it inclines at 45° for a thickness of 1", we obtain an outer diameter of 4.50". In other words, the diameter of the block 13 will be the diameter of the block 14 plus twice the thickness of the latter. Thus, the above formula determines not only the contour of the surface 11, but the diameter of the entire optical unit.

The formula can be continued for beyond the base plane of Fig. 5, thus increasing the thickness and the diameter of both surfaces for the same focal distance.

The formula can be solved for an infinite number of parallel circular planes between the base and the apex to produce the perfect curve for the surface 11, and can be similarly solved for any desired focal length by substituting the given focal length for X.

When used for receiving and focusing light from infinity at the focal point 12, the parallel rays will strike the surface 10 in a cylindrical annulus. These rays will be reflected by the surface 10 parallel to the surface planes of the blocks 12 and 13 and against the concave-conical surface 11, from which they will be reflected and concentrated at the focal point 12.

When used to project light from the focal point 12, as would be the case in headlights, spotlights, or microscopes, the rays will emanate from the point 12 to the concave-conical surface 11, from which they will be reflected in parallel circular planes against the 45° surface 10, from whence they are again reflected in perfectly parallel relation.

For spotlighting purposes and the like, the focal point 12 may be moved further away from the surface 11, to bring the reflected rays to a perfect focus at any desired distance.

With a system of the dimensions described in the above example having an outer diameter of 4.50 inches and a thickness of 1 inch, there is an exposed area to the incoming light rays of approximately 11 square inches. This is equal in area to a refracting lens of 3.75 inches in diameter. Such a lens, however, would be subject to losses in transmission which are entirely absent in the improved system. To offset these losses, the diameter of the refracting lens would necessarily have to be increased to approach a 4" diameter. This excessively large diameter would, of course, greatly decrease the depth of focus of the lens, whereas in applicant's system the depth of focus is only dependent on the diameter of the surface 11, which in the given instance is 2.50 inches. Since there is no prismatic effect in this improved reflecting system, all chromatic aberration is entirely eliminated and an increase in efficiency is obtained from this cause alone.

While the invention has been described as particularly applicable to the focusing of light rays, it will operate equally for focusing any other type of ray which can be reflected from surfaces.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A ray focusing system comprising: an annular, conical, truncated, inside reflecting surface; a second concave-conical, outside reflecting surface positioned concentrically within the annulus of, and in the plane of, the first reflecting surface, with its apex directed toward the smaller diameter of the first surface, the largest diameter of the second surface being substantially equal to the smallest diameter of the first surface, the projected width of both surfaces on the optical axis being substantially equal, the diameter of the second surface exceeding twice its width on said optical axis, any radial cut section through said second surface presenting a curved line; and any radial cut section through said first surface presenting a straight line, the radius of any plane through said second surface perpendicular to the optical axis being equal to "Y" in the following formula:

$$Y = \frac{(X+m)^2}{2X} - \frac{X}{2}$$

in which "X" is the focal length desired and "m" is the distance from the apex of the second reflecting surface along the optical axis to said plane.

2. An optical system comprising: an outer annular reflecting surface positioned to direct rays inwardly toward the optical axis of said surface; and a concave conical inner reflecting surface having its apex positioned on the optical axis and its surface positioned to receive the inwardly directed rays from said annular surface, the radius of any circular plane through said second surface perpendicular to the optical axis being equal to "Y" in the following formula:

$$Y = \frac{(X+m)^2}{2X} - \frac{X}{2}$$

in which "X" is the focal length desired and "m" is the distance from the apex of the second reflecting surface along the optical axis to said plane.

CLIFFORD W. MARTIN.

REFERENCES CITED

The following references are of record in the file of this patent:

UNITED STATES PATENTS

| Number | Name | Date |
| --- | --- | --- |
| 804,996 | Anthony | Nov. 21, 1905 |
| 2,198,014 | Ott | Apr. 23, 1940 |
| 2,380,887 | Warmisham | July 31, 1945 |

FOREIGN PATENTS

| Number | Country | Date |
| --- | --- | --- |
| 29,282 | Great Britain | 1909 |
| 137,457 | Austria | May 11, 1934 |